United States Patent [19]

Taylor

[11] Patent Number: 4,492,447

[45] Date of Patent: Jan. 8, 1985

[54] APPARATUS FOR DEVELOPING PHOTOGRAPHIC MATERIAL

[75] Inventor: Eric Taylor, London, England

[73] Assignee: Paterson Product Ltd., London, England

[21] Appl. No.: 426,198

[22] Filed: Sep. 28, 1982

[30] Foreign Application Priority Data

Oct. 2, 1981 [GB] United Kingdom ................. 8129884

[51] Int. Cl.[3] .......................... G03B 3/04; G03B 13/04

[52] U.S. Cl. .................................... 354/312; 354/327; 354/330

[58] Field of Search ............... 354/312, 313, 314, 315, 354/316, 323, 326, 327, 328, 329, 330, 331

[56] References Cited

U.S. PATENT DOCUMENTS

| | | | |
|---|---|---|---|
| 1,871,374 | 8/1932 | John . | |
| 2,220,567 | 11/1940 | Wright | 354/327 |
| 2,861,509 | 11/1958 | Dodson | 354/327 |
| 3,465,664 | 9/1969 | Bochman | 354/312 |
| 3,478,666 | 11/1969 | Bishop . | |
| 3,644,036 | 2/1972 | Canfield . | |
| 3,903,540 | 9/1975 | Hampl | 354/328 |

FOREIGN PATENT DOCUMENTS

| | | |
|---|---|---|
| 1955250 | 5/1971 | Fed. Rep. of Germany . |
| 2643819 | 4/1977 | Fed. Rep. of Germany . |

*Primary Examiner*—A. A. Mathews
*Attorney, Agent, or Firm*—Darby & Darby

[57] ABSTRACT

Photographic developing apparatus is described which includes a tray for receipt of photographically sensitized material to be developed having a light tight lid to form the processing tank and a raised annular foot on the underside of the tray. The apparatus also includes a domed base, the domed base and the underside of the tray member being such that, when the tray member is mounted on the domed base, substantially a point of the tray member within the annular foot is movable in a circular path substantially about the central axis of the domed base with the annular foot bearing on the domed base. The tray may also be rotatable about its central axis. The tray, on the domed base, can be driven manually or by motor, to give the tray a rocking movement. In this photographic sensitized material can be developed in the tray using small amounts of processing liquid but ensuring good spreading of that processing liquid over the material being processed.

5 Claims, 7 Drawing Figures

APPARATUS FOR DEVELOPING PHOTOGRAPHIC MATERIAL

Figure 1:
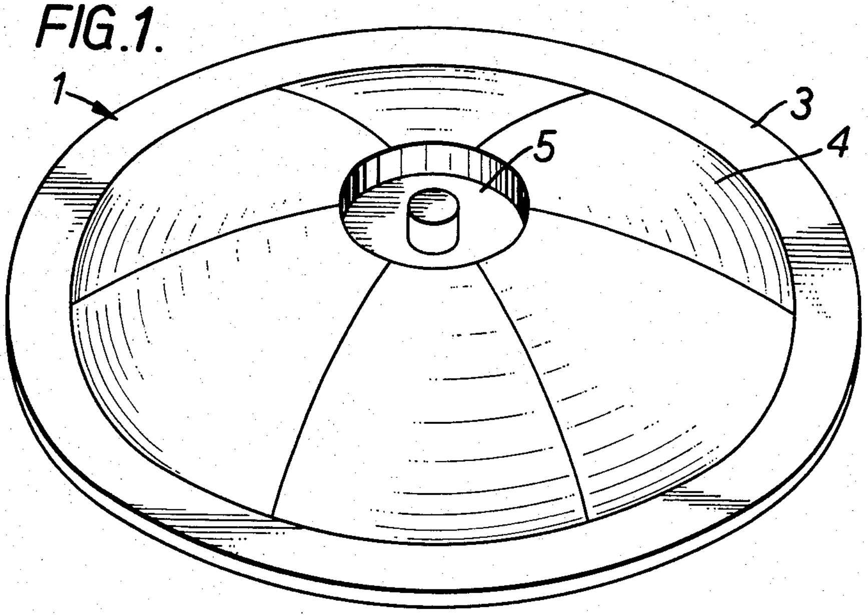

This invention relates to apparatus for processing photographic material and particularly to apparatus for processing photographically sensitised material for facilitating the processing of photographic prints.

For many years in both the professional and amateur field it has been commonplace to produce photographic prints by a two-stage method. First photographically sensitised material is exposed in a camera and the exposed material then developed and fixed to give a negative of the desired picture. This negative is then used in an enlarger or contact printer apparatus by passing a light through the negative to fall on a further sheet of photographically sensitised material, which further sheet is then developed and fixed to give the final photographic print bearing the positive image.

This two-stage system is advantageous in that the photographically sensitised material used in the camera can be of small and fixed format and convenient to handle and process to give the negative image. The subsequent exposure through a negative in an enlarger or contact printer apparatus may on the other hand be varied very widely according to the desired end effect e.g. the exposure and size of the final print.

Problems arise particularly in the second half of this overall photographic process. One of these problems concerns the carrying out of the developing and fixing stages to produce the final print. The print material is generally in the form of flat sheet, usually photographic paper, of varying size according to the enlargement carried out. Such development and fixing has generally been carried out by immersing the exposed photographic sheet material in trays of processing liquid. The trays are then generally reciprocated, e.g. by hand, to try to ensure adequate and uniform contact of the processing liquid with the exposed print material in order to obtain good results. However it is often found that the results obtained are not adequately uniform and control of the development particularly as regards consistent results and constant temperature conditions is difficult. Further the use of such trays is very expensive and wasteful of processing liquid.

Previous attempts at using smaller volumes of processing liquid and providing improved control of the processing conditions have in the main been directed to the use of so-called drum processors. The exposed print material is placed inside the processing drum together with a small quantity of processing liquid. With the drum horizontal or substantially horizontal, it is rotated about its axis in order to spread the processing liquid over the entire surface of the photographic print material inside. At the same time the drum may be reciprocated longitudinally in order to maintain even processing. A wide variety of drum processors has been proposed, manufactured and sold, particularly in the amateur photographic market. However of course in order to place the photographic print material, which has been exposed flat, in the drum processor it must be curled up and made to lie against the inside of the rotatable drum. This can be an awkward procedure particularly when loading small prints. Further the drums themselves can be somewhat complex.

A further problem which arises in the second half of the overall photographic process is the very wide possibility of variation in the detailed parameters. This causes difficulties particularly for amateur photographers and many attempts have been made in recent years to provide apparatus and develop processes for use by amateur photographers which permit of reasonable variation but are tolerant of inadequately developed skills on the part of the user.

According to a first feature of the present invention there is provided apparatus for processing photographically sensitised material which apparatus comprises a tray for receipt of the photographically sensitised material to be processed; a lid adapted to fit the tray and render the interior of the processing tank so formed light tight, the lid having light tight means for introducing processing liquid into the interior of the processing tank; a raised annular foot on the underside of the tray member; and a domed base; the domed base and the underside of the tray member being such that, when the tray member is mounted on the domed base, a point of the tray member within the raised annular foot is movable in a substantially circular path substantially about the central axis of the domed base with the annular foot bearing on the domed base.

Thus, in the processing apparatus according to the present invention, photographic print material can be processed in flat form in the tray and accordingly there is no need to curl up the print material as was necessary with the previous drum processors. In addition the present invention offers a very simple solution to the problem of adequate spreading of processing liquid over the material to be processed while at the same time using a small quantity of processing liquid. Thus when the tray is mounted on its domed base and moved such that a point of the tray member describes a substantially circular path about the central axis of the domed base, the tray is caused to rock both sideways and lengthways of the tray. When the tray is mounted on the domed base, the annular foot of the tray bearing on the domed base will be lower on one side of the tray than on the other side of the tray. This gives the tray a tilt from the horizontal. As the tray point is moved along its circular path around the central axis of the domed base that part of the annular foot bearing on the domed base which is lowest is constantly changing and the height of any particular part of the annular foot is constantly changing. This means that the tilt of the tray is constantly changing as its point describes its circular path giving the tray a both sideways and lengthways rocking motion. In order to provide a smooth and uniform rocking motion it should preferably be the midpoint of the tray within the annular ring which is moved about the circular path around the central axis of domed base. Accordingly, when the tray is in use with processing liquid inside, the processing liquid is caused to move about within the tray by the rocking motion and thus ensures that it is well spread over and has good contact with print material in the tray even with small amounts of processing liquid.

The processing apparatus according to the present invention may be operated manually or may be motor driven.

For manual operation, conveniently the underside of the tray member is provided at substantially its midpoint, which is also substantially the centre of the raised annular foot, with a peg and the domed base comprises a circular groove about its central axis, when the tray member is mounted on the domed base, the peg engaging within the central groove so that it is movable in a circular path within the groove. Such apparatus can be simply operated by hand to move the peg about its circular groove in the domed base. For consistency of results from print to print, it is preferable that the motion imparted to the tank by the operator should be substantially uniform. However this technique can be achieved with only a little practice.

Alternatively, to ensure consistent results from print to print and also in order to free the operator for doing other things, it may be preferred to use a motor driven apparatus. In this case the tray may be of the same form as for manual drive i.e. the underside of the tray member is provided at substantially its midpoint and the centre of the annular foot with a raised peg. The domed base comprises the drive means which, when the tray member is mounted on the base, engage, e.g. the peg, on the underside of the tray member and move it about a circular path about the central axis of the domed base. When the processing apparatus is motor driven, in addition to the rocking motion, due to a rotational moment between the drive imparted to the tray and friction between the annular ring and surface of the domed base, there may also be imparted to the tray a slow rotational movement in a direction counter to that imparted by the drive to the tray. Any such rotational movement is generally prevented from occurring when the apparatus is driven by hand.

Preferably once the photographic print material to be processed has been placed in the tray and the lid placed thereover, there should be no need for the lid to be removed until processing has been completed. This means that once the lid has been put in place, there is no need for the process to be carried out in the dark. Accordingly, in addition to the lid of the present apparatus comprising light tight means for introducing processing liquid into the interior of the tray, the apparatus also preferably includes light tight means for discharging of processing liquid from the interior of the tray.

The tray of the processing apparatus according to the present invention is particularly suitable for use in the second feature of the present invention. According to this second feature, there is provided apparatus for the preparation of photographic prints consisting of a fixed focus enlarger having light source, negative carrier, optical system and base, the the base being adapted to receive a light tight cassette, the light source, negative carrier, optical system and cassette when so received being enclosed by a light tight housing, and a cassette adapted to be fitted into the base of the enlarger, the cassette comprising a receptacle adapted to receive a sheet of light-sensitive photographic material and having a wall movable between a position in which the interior of the cassette is maintained light tight and a position in which light may fall on the photosensitive surface of the sheet material in the cassette, and a lid for the cassette which is adapted to fit on the cassette and to act as an external light tight cover so that on removal of the cassette from the enlarger, the combination of cassette and lid constitutes a processing tank for the sensitised material therein.

Preferably the processing tank is configured to be mounted on agitation apparatus so that exposed photosensitised material in a so-constituted tank may be subjected to processing treatments using only small quantities of processing solution for that purpose but ensuring the rapid and even spread of the solution on the photosensitive material. Most suitable therefore, in accordance with the first feature of this invention, the cassette is in the form of a tray for receipt of the tray photographically sensitised material and has a raised annular foot on its underside and is such that, when the tray is mounted on a domed base engageable therewith, a point of the tray member within the annular foot is movable in a circular path substantially about the central axis of the domed base with the annular foot bearing on the domed base.

Apparatus according to this second aspect of the present invention presents a number of advantages. First of all, the provision of the enlarger effectively surrounded by a light tight enclosure obviates the need to do work in a darkroom. This is particularly valuable for many ameteurs who do not have the facility of a darkroom; with appropriate design this apparatus may be used in a domestic kitchen. The photosensitive material may be loaded into the cassette by the user using a photographic changing bag of known type. The ability to convert the cassette, once it has been used for exposing the enlargement, to a processing tank, particularly one which uses only a small amount of processing liquid, allows particularly elegant processing to be effected. Using this apparatus photographic prints may be produced simply and reliably by even the amateur photographer with a low level of development skills.

This apparatus may of course be used in the processing of both black and white and colour photographic material. In the latter case the apparatus may embody an appropriate colour analyser system and filter system.

The apparatus may further include means for varying the aperture of the optical system, i.e. means for varying the intensity of the illumination falling on the enlarger base, and accordingly on the sheet of photosensitive material located in the cassette.

Figure 2:
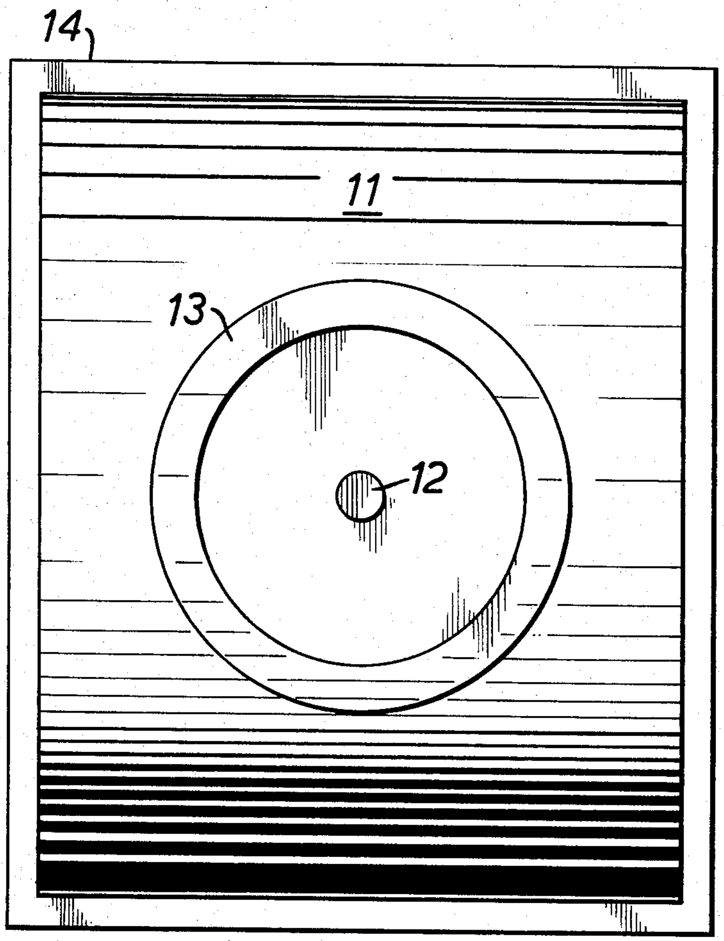
Figure 3:
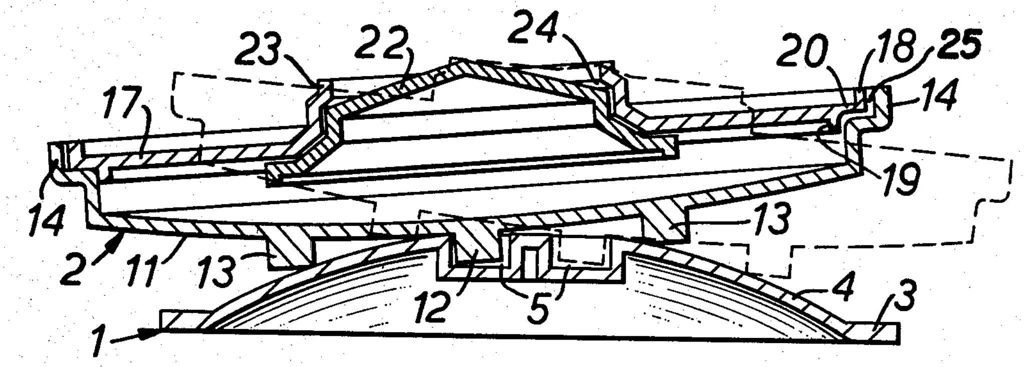
Figure 4:
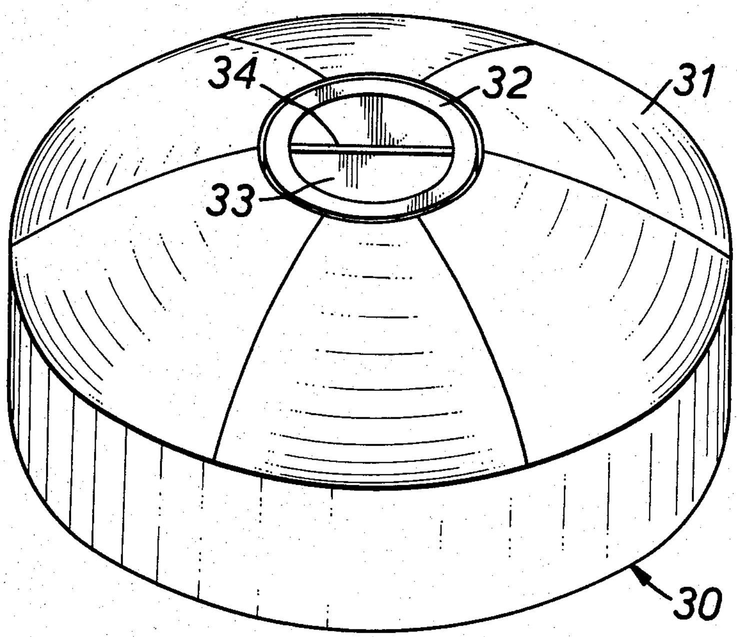
Figure 5:
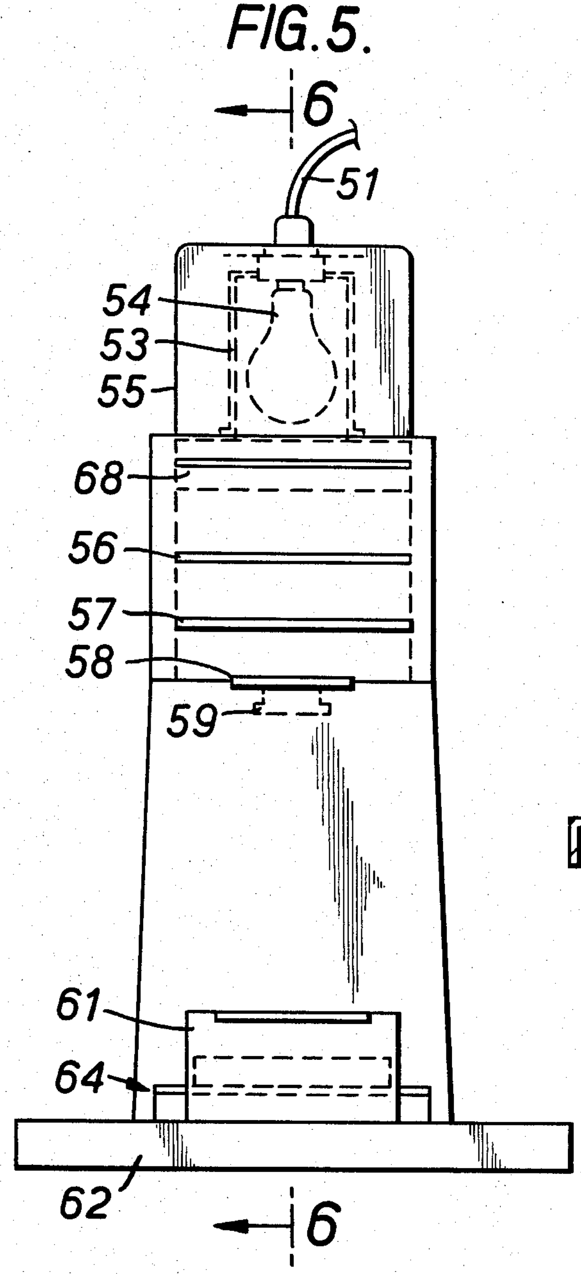
Figure 6:
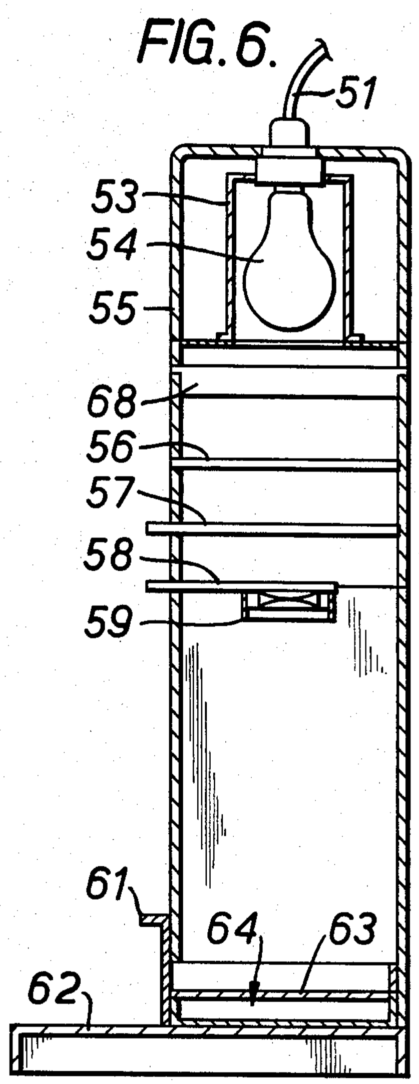
Figure 7:
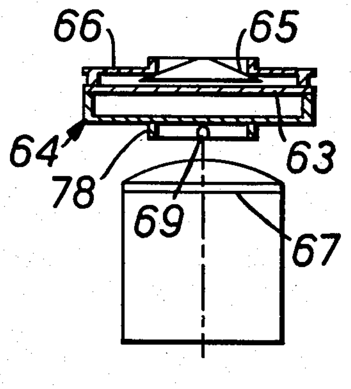

The invention is further illustrated, by way of example, with reference to the accompanying drawings in which:

FIG. 1 is a perspective view of a domed base comprising part of a manually operated processing apparatus according to the present invention, FIG. 2 is a bottom plan view of a tray of the processing apparatus according to the present invention, FIG. 3 is a section through processing apparatus according to the present invention comprising the domed base of FIG. 1 and tray of FIG. 2; in dashed line on FIG. 3 there is shown another position of the tray to illustrate its movement, FIG. 4 shows a domed base for use in the motor driven embodiment of the developing apparatus, FIG. 5 is a front view of apparatus for the manufacture of photographic prints according to the invention, FIG. 6 is a vertical section along the line 6—6 shown in FIG. 5, and FIG. 7 is a vertical section through a cassette, lid and drive means.

Referring to FIGS. 1 to 3 of the accompanying drawings, the processing apparatus comprises a domed base 1 and processing tank 2. The domed base 1 is constructed with a lip 3 so that it may sit firmly on a flat surface and from this lip 3 extends the domed surface 4. Towards the top of the domed surface 4 however there is provided in the domed base 1 a circular groove 5 around the central axis of the dome.

The processing tank 2 comprises a tray 11 having at the midpoint of its underside a peg 12 around which is provided a raised annular foot 13. The upper part of tray 11 is provided with a shoulder 14 on which fits a lid 17 to the tray. The lid 17 is held in place suitably by simple catches (not shown) on the lid 17 and shoulder 14. In order to ensure that the lid 17 is light tight at its edges, it is provided with upwardly and downwardly extending lips 18 and 19 respectively. Suitably however towards one of the corners of the lid a portion of the downwardly extending lip 19 and a portion 20 of the lid itself outside lip 19 are partially cut away or formed in a thinned out manner to provide a light tight channel 25 for processing allowing liquid to be discharged from the processing tank. The removal of liquid is accomplished by removing the tank from the base 1 and tilting it toward the channel 25. As will be noted from FIG. 3 the channel 25 provides an opening for discharging the fluid but the curved nature of the channel 25 does not allow light to pass through it into the interior of the tank.

In addition to lid 17 includes a concial member 22 mounted, in light tight manner, within raised wall 23 extending from the lid 17. Between the conical member 22 and raised wall 23 there is defined a small channel 24 via which processing liquid may be introduced into the interior of the processing tank while the tank remains light tight. Suitably the conical member 22 is detachably mounted on the lid (e.g. by means of catches (not shown) on the underside of lid 17) in order that it may be detached for ease of cleaning of the tank after use.

The processing apparatus shown in FIGS. 1 to 3 is used as follows. Exposed photographic print material is place in tray 11. The print material may take the form of one sheet or alternatively several smaller sheets may be placed alongside each other in the tray at one time. In this case then it is necessary to provide separators in the tray to keep the prints apart during their processing. These separators can take the form of simple detachable studs which can be detachably mounted in appropriately placed indentations in the base of the tray. Once the exposed photographic print material has been placed in the tray and if necessary arranged satisfactorily, the lid 17 (with conical member 22 in place) is placed on the tray 11. There is thus formed a light tight processing tank and accordingly the processing does not have to take place in the dark.

For the processing of the print material, the processing tank 2 comprising tray 11 and its lid 17 are mounted on the domed base 1; the peg 12 on the underside of tray 11 engaging in the circular groove 5 in the domed base and the annular foot 13 bearing against the domed surface of the domed base 1. As is illustrated in FIG. 3, when the processing tank 2 is mounted in the domed base 1, the tank 2 is tilted. This is because the peg 12 is not at the central axis of domed base 1 but is distanced therefrom in circular groove 5 therearound. This has the effect that the annular foot 13 of the tray bearing on the domed surface 4 is lower on one side of the tray than on the other side.

The operator then sets the tray in motion. It will be appreciated that when the processing liquid is to be added to the tray the tray should already be in motion before the liquid is added. Thus by hand the peg 12 is caused to move along the circular path defined by circular groove 5. As the peg 12 moves along the circular path the part of the annular foot 13 bearing on the domed surface 4 which is lowest is constantly changing and the height of any particular part of the annular foot 13 is constantly changing. This imparts to the processing tank a constant smooth rocking motion both sideways and lengthways of the tray. This rocking motion is illustrated in FIG. 3 which shows, in solid line, the position of the processing tank when the peg 12 is at one position in its circular path and, in dotted line, the position of the processing tank when at 180° thereto.

Processing liquid is introduced into the processing tank via the channel 24 defined between raised wall 23 of lid 17 and conical member 22. Processing liquid poured onto conical member 22 automatically goes down this channel 24. The rocking movement of the processing tank 2 is continued thus ensuring that the processing liquid is adequately and uniformly spread over the material to be processed within the processing tray.

When the processing has been completed then the processing tank 2 may simply be removed from the domed base 1 and tipped to allow the processing liquid to be discharged from the tank at the corner where the lid is partly cut away to accommodate this.

Before the next processing stage, the print material can be rinsed simply by introducing water into the processing tank 2 down channel 24 without removing the print or the lid 17 from the tank. After rinsing the water is discharged from the tank 2 by inversion in the same way as for the processing liquid. Indeed the water rinsing stages may be used to control temperature within the tank by using water of a specific temperature.

Because during the processing step the tank is being continually rocked, the amount of processing liquid required is very much less than that normally required for developing print material in flat form.

Referring to FIG. 4, an electric motor (not shown) is housed in a casing 30 having an upper domed surface 31. In the centre of the domed surface 31 is a circular section 32 connected to the electric motor to rotate within domed surface 31. Within circular section 32 is a circular recess 33 across which extends a wall 34.

For use a processing tank 2 is mounted on the domed base of FIG. 4 with the peg 12 on the underside of the tray 11 engaging in the recess 33 in circular section 32. Because of the relative size of the recess 33 accurate positioning is not required by the operator to engage the peg 12 in the recess 33. However the peg 12 is held towards the outside of the recess between its wall and the wall 34 thereacross.

The annular foot 13 on the underside of the tray 11 will bear on the domed surface 31 in analogous fashion to the embodiment shown in FIGS. 1 to 3 with the tray at a tilt.

When the motor is switched on, the circular section 32 will be caused to rotate and with it peg 12. Peg 12 will thus describe a circular path around the central axis of the domed surface 31 and accordingly in analogous manner to the embodiment shown in FIGS. 1 to 3 of the drawings there is imparted a rocking motion to the processing tray. In addition in this motor driven embodiment, there may also be imparted to the tray 11 a slow rotary movement about peg 12 due to a rotational moment between the movement given to the peg and friction between the annular ring 13 and domed surface 31. This rotary movement is in a direction counter to the drive direction of circular section 32.

FIGS. 5 to 7 of the accompanying drawings show apparatus for the production of photographic prints. These Figures show an enlarger consisting of a light tight housing 55 on a base 62. Located at the top of the housing 55 is a light source 54 set in a heat sink 53 which may be connected by means of a cable 51 to a source of electric current.

Located immediately below the light source is a colour filter pack 68 and below that a diffuser 56. Located below the diffuser 56 is a negative carrier 57 which is laterally slideable to engage a negative to be introduced into the optical path between the light source 54 and the base of the enlarger.

Below negative carrier 57 is a variable aperture device 58 and lens unit 59. Lens unit 59 is adapted to focus an image of a negative placed in negative carrier 57 at a plane slightly above the upper surface of base 62.

At the bottom of the housing 55 is an aperture at one side into which a cassette 64 may be introduced. A slideable light tight door 61 is provided for covering the aperture in the base of casing 55 following the insertion of a cassette 64.

Cassette 64 itself consists of a generally rectangular tray adapted to receive a sheet of sensitised photographic paper or the like. It has a cover which can be used to prevent light reaching the interior of the cassette but which may be withdrawn from the outside when the cassette is in the position shown in FIG. 6 to enable the photosensitive material to be exposed.

In addition the apparatus includes a lid 66 for the cassette including a light tight aperture 65. When lid 66 is placed on the top of cassette 65, and slide 63 is then removed, the assembly of the base of cassette 64 and lid 66 then constitutes a light tight developing tank into which processing liquid may be introduced via aperture 65.

The base of the cassette 64 is provided with an annular rim 78 and inside the annular rim is a drive dog 69. This rim may be set on the domed upper surface of the drive unit 67 which has set in its upper surface a drive member adapted to engage the drive dog 69. The drive member may be driven by a motor (not shown) in a circular path about the central axis. When so driven, the cassette 64 carries out a rocking motion which may also be accompanied by a slow rotary motion in a direction counter to the direction of the drive dog. Processing liquid is rapidly, evenly and repeatedly spread over sensitised material in the cassette. When appropriate processing has be effected the liquid may be removed by lifting the cassette 64 from unit 67 and pouring the liquid out through one corner, where the lid 66 and/or the base are cut away slightly to allow the egress of liquid. Rinsing may be effected simply by placing the whole unit in a sink and pouring water into aperture 65.

I claim:

1. Apparatus for developing photographically sensitised material comprising: a tray for receipt of the photographically sensitised material to be processed, said tray having a raised annular foot on an underside thereof; a lid adapted to fit the tray forming a light tight processing tank, the lid having light tight means introducing processing liquid into the interior of the processing tank; and a domed base; whereby when said tray is mounted on said domed base, a point of said tray within the raised annular foot is movable in a substantially circular path substantially about the central axis of said domed base with the annular foot bearing on said domed base.

2. Apparatus according to claim 1 wherein the tray is provided on its underside at substantially the centre of its annular foot and the midpoint of the tray with a raised peg and the domed base comprises a circular groove about its central axis, whereby the tank is mounted on the domed base, the peg engages the circular groove so that the peg is movable in a circular path within the groove.

3. Apparatus according to claim 1 wherein the domed base comprises drive means and the tray has on its underside within the annular foot, means for engaging said drive means such that when so engaged and mounted on the domed base the tray can be driven to move substantially about the central axis of the domed base by the drive means.

4. Apparatus according to claim 3 wherein said means for engaging comprises a raised peg provided on the underside of said tray at substantially the centre of its annular foot and the midpoint of the tray, said peg engaging with the drive means of the domed base.

5. Apparatus according to claim 1, further comprising a light tight channel for discharging processing liquid from the interior of the tank.

* * * * *